United States Patent
Choi et al.

(10) Patent No.: US 11,647,302 B2
(45) Date of Patent: May 9, 2023

(54) METHOD OF CALIBRATING IMAGE SENSOR AND DEVICE FOR CALIBRATING IMAGE SENSOR

(71) Applicant: SAMSUNG ELECTRONICS CO., LTD., Suwon-si (KR)

(72) Inventors: Wooseok Choi, Suwon-si (KR); Hyungoh Kim, Seoul (KR); Sungjin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 126 days.

(21) Appl. No.: 17/180,226

(22) Filed: Feb. 19, 2021

(65) Prior Publication Data

US 2021/0266503 A1    Aug. 26, 2021

(30) Foreign Application Priority Data

Feb. 21, 2020    (KR) ........................ 10-2020-0021764
Jun. 22, 2020    (KR) ........................ 10-2020-0075937

(51) Int. Cl.
| | | |
|---|---|---|
| *H04N 9/04* | (2006.01) | |
| *G06T 7/80* | (2017.01) | |
| *H04N 5/369* | (2011.01) | |
| *H04N 5/359* | (2011.01) | |
| *G06T 7/90* | (2017.01) | |
| *G06T 7/00* | (2017.01) | |

(52) U.S. Cl.
CPC ........... *H04N 9/04517* (2018.08); *G06T 7/80* (2017.01); *G06T 7/90* (2017.01); *G06T 7/97* (2017.01); *H04N 5/359* (2013.01); *H04N 5/36961* (2018.08)

(58) Field of Classification Search
CPC .............. H04N 9/04517; H04N 5/359; H04N 5/36961; H04N 9/0451; H04N 9/04557; H04N 17/002; G06T 7/80; G06T 7/90; G06T 7/97

See application file for complete search history.

(56) References Cited

U.S. PATENT DOCUMENTS 7,202,543 B2    4/2007    Cole
8,767,100 B2    7/2014    Chen et al.
(Continued)

FOREIGN PATENT DOCUMENTS

JP    6184132 B2    8/2017

*Primary Examiner* — Twyler L Haskins
*Assistant Examiner* — Angel L Garces-Rivera
(74) *Attorney, Agent, or Firm* — Sughrue Mion, PLLC

(57) ABSTRACT

A method of calibrating an image sensor includes obtaining a plurality of multi-light source images generated from a plurality of image sensor modules, wherein each of the plurality of image sensor modules generates at least three multi-light source images; obtaining, based on the plurality of multi-light source images, a plurality of crosstalk levels and a plurality of color-specific correction coefficients; generating modeling data based on a relationship between a crosstalk level for a first color and the plurality of color-specific correction coefficients; and obtaining, based on a single light source image captured by a first image sensor module and the modeling data, a color-specific correction coefficient for a target pixel of an image sensor, the image sensor being provided in the first image sensor module, and the color-specific correction coefficient being usable for correcting a crosstalk of the target pixel.

20 Claims, 9 Drawing Sheets

(56) References Cited

U.S. PATENT DOCUMENTS

| | | |
|---|---|---|
| 9,392,237 B2 | 7/2016 | Toyoda |
| 9,584,743 B1 | 2/2017 | Lin et al. |
| 9,620,541 B2 | 4/2017 | Ito |
| 10,122,950 B2 | 11/2018 | Ono |
| 2019/0068861 A1 | 2/2019 | Nakashima et al. |

METHOD OF CALIBRATING IMAGE SENSOR AND DEVICE FOR CALIBRATING IMAGE SENSOR

CROSS-REFERENCE TO RELATED APPLICATIONS

This application is based on and claims priority under 35 U.S.C. § 119 to Korean Patent Application No. 10-2020-0021764, filed on Feb. 21, 2020, and Korean Patent Application No. 10-2020-0075937, filed on Jun. 22, 2020, in the Korean Intellectual Property Office, the disclosures of which are incorporated by reference herein in their entireties.

BACKGROUND

Example embodiments of the disclosure relate to calibration of an image sensor, and more particularly, to methods and devices for calibrating an image sensor by obtaining a correction coefficient for correcting crosstalk in the image sensor.

An image sensor may include a pixel array that senses a received optical signal. In order to obtain high-quality images, pixels of the image sensor are highly integrated. In addition, as the image sensor has an auto-focusing function, the pixel array may include phase detection pixels, which may be arranged discontinuously and regularly within the pixel array. As the pixel size in the image sensor decreases and the pattern of the pixel array becomes non-uniform, a problem arises in that crosstalk between pixels increases. Crosstalk refers to a deterioration in color reproducibility due to a change of a spectral characteristic of a signal generated from an arbitrary pixel as a signal generated from an adjacent pixel affects the arbitrary pixel. Accordingly, the image quality of the image sensor may deteriorate. Therefore, crosstalk correction is required to adjust pixel values so that the influence of crosstalk is removed or minimized.

SUMMARY

Example embodiments of the disclosure provide methods and devices for calibrating an image sensor by efficiently obtaining a correction coefficient for correcting crosstalk in an image sensor.

In accordance with an aspect of an example embodiment, there is provided a method of calibrating an image sensor includes obtaining a plurality of multi-light source images generated from a plurality of image sensor modules, wherein each of the plurality of image sensor modules generates at least three multi-light source images; obtaining, based on the plurality of multi-light source images, a plurality of crosstalk levels and a plurality of color-specific correction coefficients; generating modeling data based on a relationship between a crosstalk level for a first color and the plurality of color-specific correction coefficients; and obtaining, based on a single light source image captured by a first image sensor module and the modeling data, a color-specific correction coefficient for a target pixel of an image sensor, the image sensor being provided in the first image sensor module, and the color-specific correction coefficient being usable for correcting a crosstalk of the target pixel.

In accordance with an aspect of an example embodiment, there is provided a device for calibrating an image sensor, the device including: a memory configured to store modeling data, the modeling data representing color-specific correction coefficient functions for a target pixel; and a processor configured to obtain a crosstalk level of the target pixel from a single light source image obtained from an image sensor, and obtain a color-specific correction coefficient of the target pixel based on the modeling data and the crosstalk level of the target pixel, the color-specific correction coefficient being usable for correcting a crosstalk of the target pixel.

In accordance with an aspect of an example embodiment, there is provided a method of calibrating an image sensor, the method including: obtaining a crosstalk level of a target pixel from a single light source image obtained from an image sensor; obtaining a color-specific correction coefficient of the target pixel by applying the crosstalk level to pre-obtained color-specific correction coefficient functions for the target pixel, the color-specific correction coefficient being usable for correcting a crosstalk of the target pixel.

BRIEF DESCRIPTION OF THE DRAWINGS

The above and/or other aspects will be more apparent by describing certain example embodiments with reference to the accompanying drawings, in which.

DETAILED DESCRIPTION

Hereinafter, various example embodiments will be described in connection with the accompanying drawings.

Figure 1:
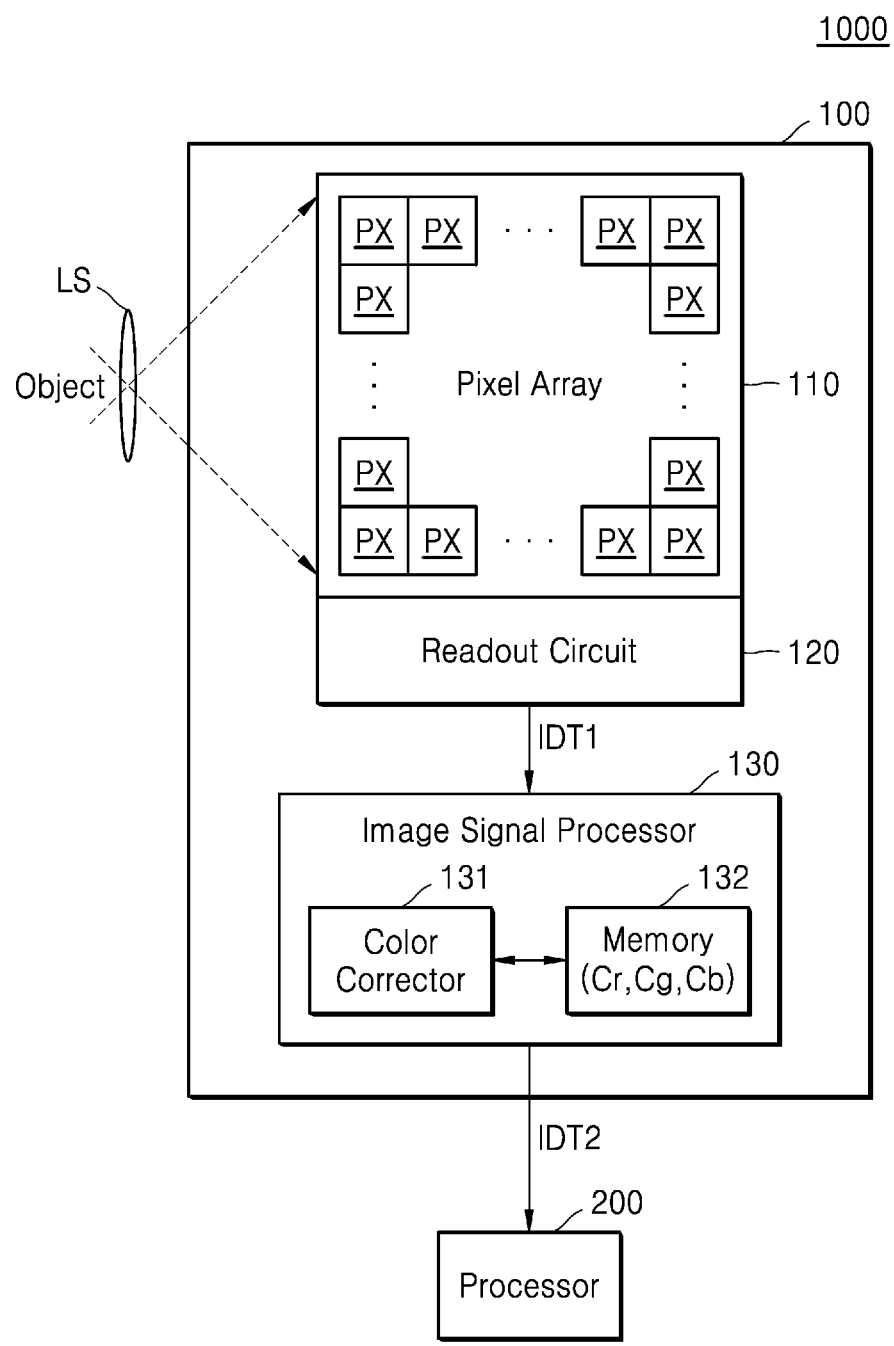
FIG. 1 is a block diagram illustrating an image sensor and an electronic device including the same according to an example embodiment.

FIG. 1 is a block diagram illustrating an image sensor and an electronic device including the same according to an example embodiment.

Referring to FIG. 1, an electronic device 1000 according to an example embodiment may include an image sensor 100 and a processor 200. The image sensor 100 may convert an optical signal of an object incident through an optical lens LS into image data. The image sensor 100 may be mounted on an electronic device having an imaging function and/or light sensing function. For example, the image sensor 100 may be mounted on the electronic device 1000 such as digital still cameras, digital video cameras, smartphones, wearable devices, Internet of Things (IoT) devices, tablet Personal Computers (PCs), Personal Digital Assistants (PDAs), Portable Multimedia Players (PMPs), navigation devices, and the like. In addition, the image sensor 100 may be mounted on the electronic device 1000 provided as a component for vehicles, furniture, manufacturing facilities, doors, various measuring devices, and the like. For example, the electronic device 1000 may be implemented as a mobile device such as a smart phone or a wearable device, and the processor 200 may be an Application Processor (AP).

Referring to FIG. 1, the image sensor 100 may include a pixel array 110, a readout circuit 120, and an image signal processor 130. In an embodiment, the pixel array 110, the readout circuit 120, and the image signal processor 130 may be implemented as a single semiconductor chip or a single semiconductor module. In an embodiment, the pixel array 110 and the readout circuit 120 may be implemented as one semiconductor chip or one semiconductor module, and the image signal processor 130 may be implemented as another semiconductor chip or another semiconductor module.

The pixel array 110, for example, may be implemented with a photoelectric conversion element such as a Charge Coupled Device (CCD) or a Complementary Metal Oxide Semiconductor (CMOS), and may be implemented with various types of photoelectric conversion devices. The pixel array 110 includes a plurality of pixels that convert a received optical signal (light) into an electrical signal, and the plurality of pixels may be arranged in a matrix.

Each of the plurality of pixels includes a light detection element (or a photoelectric conversion device). For example, the light detection element may include a photo diode, a photo transistor, a photo gate, a pinned photodiode, a perovskite photodiode, an organic photodiode, an organic photoconductive film, and the like. Additionally or alternatively, various light detection elements may be used.

The plurality of pixels may detect light using a light detection element, and may convert the detected light into an electrical signal. Each of the plurality of pixels may detect light in a specific spectral region. For example, a plurality of pixels may include a pixel (hereinafter referred to as a red pixel) that converts light in a red spectrum region into an electrical signal, a pixel (hereinafter referred to as a green pixel) that converts light in a green spectral region into an electric signal, and a pixel (hereinafter referred to as a blue pixel) that converts light in a blue spectrum region into an electric signal. However, one or more embodiments are not limited thereto, and the plurality of pixels may further include, for example, white pixels. As another example, the plurality of pixels may include pixels combined in different color configurations, for example, a yellow pixel, a cyan pixel, and a green pixel.

A color filter array that transmits light in a specific spectral region may be disposed on the plurality of pixels, and a color detectable by a corresponding pixel may be determined according to a color filter disposed on each of the plurality of pixels. However, one or more embodiments are not limited thereto, and in an embodiment, light in a specific wavelength band may be converted into an electric signal according to a level of an electric signal applied to a light detection element of each of the plurality of pixels.

Figure 2A:
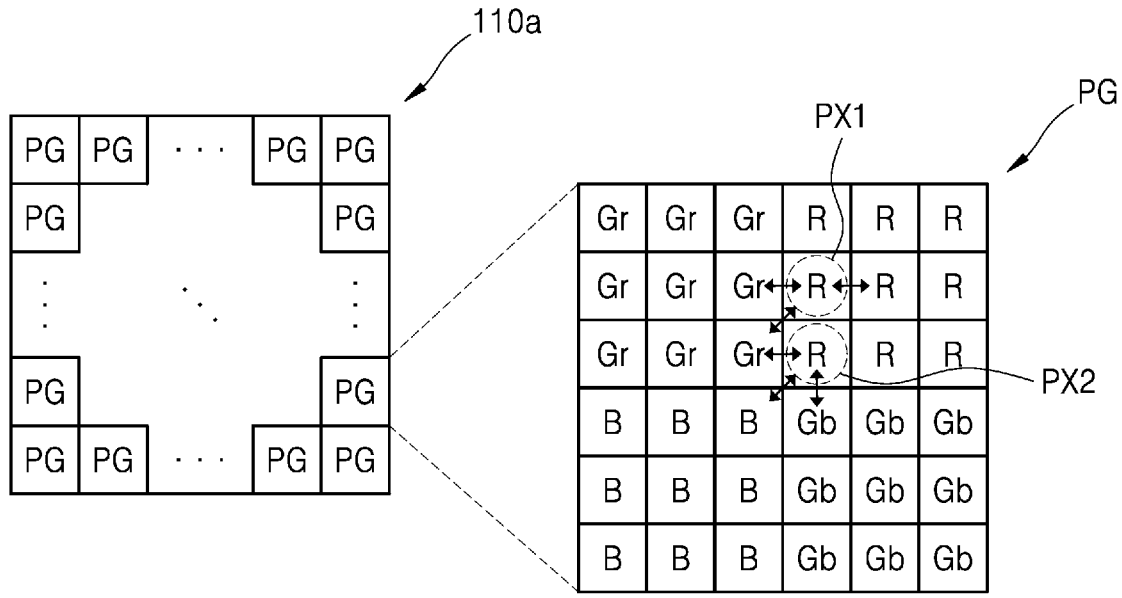
FIGS. 2A and 2B illustrate examples of a pixel array.
Figure 2B:
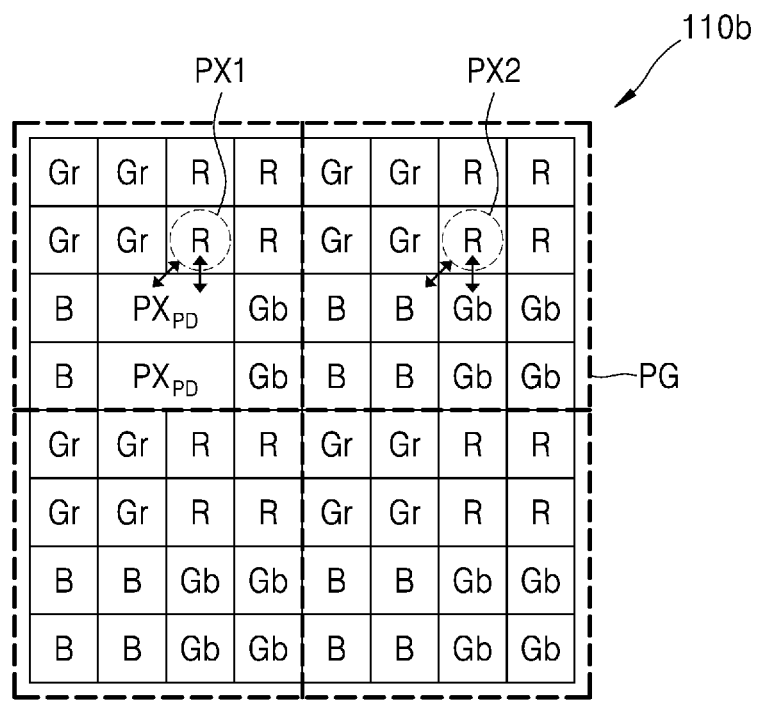

FIGS. 2A and 2B illustrate examples of a pixel array.

Referring to FIG. 2A, a pixel array 110a may include a color filter having the same color of nine pixels PX arranged in a 3×3 matrix. The pixel array 110 may have an arrangement structure in which a pixel group PG including 9 red pixels R, 9 green pixels Gr, 9 blue pixels B, and 9 green pixels Gb, each arranged in a 3×3 matrix, is repeatedly arranged (hereinafter, the green pixel Gr will be referred to as a first green pixel, and the green pixel Gb will be referred to as a second green pixel). The pixel array 110a having this structure may be referred to as a Nona Color Filter Array (CFA).

Even between pixels of the same color, a signal difference may occur between signals generated from the pixels PXs due to an influence from pixels disposed around the pixels PXs. For example, referring to FIG. 2A, a first pixel PX1 and a second pixel PX2 are both red pixels R, and may be disposed at similar positions in the pixel array 110a. However, the first green pixel Gr and the red pixel R are disposed near the first pixel PX1, and the first pixel PX1 is affected by the surrounding first green pixel Gr and the surrounding red pixel R. In the vicinity of the second pixel PX2, in addition to the first green pixel Gr and the red pixel R, the second green pixel Gb and the blue pixel B are disposed. Accordingly, the second pixel PX2 is affected by the surrounding first green pixel Gr, red pixel R, second green pixel Gb, and blue pixel B.

Moreover, in addition to the Nona CFA as shown in FIG. 2A, the pixel array 110a may have a CFA structure in which pixels of the same color are arranged in a k×k matrix (k is an integer of 2 or more).

Referring to FIG. 2B, in the pixel array 110b, some of the pixel groups PG that are repeatedly arranged may include a phase difference detection pixel $PX_{PD}$. In an embodiment, a plurality of phase difference detection pixels $PX_{PD}$ may be consecutively arranged in rows or columns.

The pixel array 110b may include red pixels, green pixels, and blue pixels, and four pixels PX arranged in a 2×2 matrix may include color filters having the same color. A pixel group PG including 4 red pixels R, 4 green pixels Gr, 4 blue pixels B, and 4 green pixels Gb, each arranged in a 2×2 matrix, is repeatedly arranged. The pixel array 110a having such a structure may be referred to as a Quad Bayer Color Filter Array (CFA). However, one or more embodiments are not limited thereto, and the pixel array 110b may have a Bayer CFA structure in which the pixel group PG, including one red pixel, two green pixels, and one blue pixel in a 2×2 matrix, is repeatedly arranged or have a CFA structure in which pixels of the same color are arranged in a k×k matrix (k is an integer of 2 or more).

A phase difference detection pixel $PX_{PD}$ will be described with reference to FIGS. 3A and 3B.

Figure 3A:
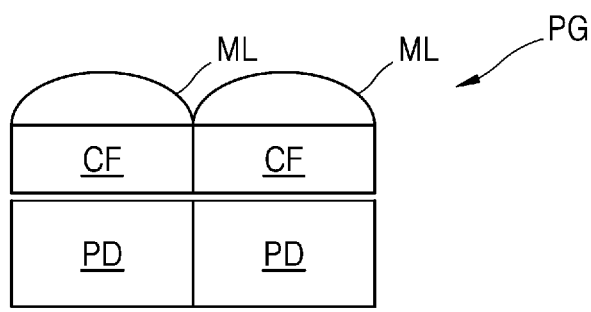
FIG. 3A schematically shows a vertical cross-sectional view of a normal pixel, and FIG. 3B schematically shows a vertical cross-sectional view of a phase difference detection pixel.
Figure 3B:
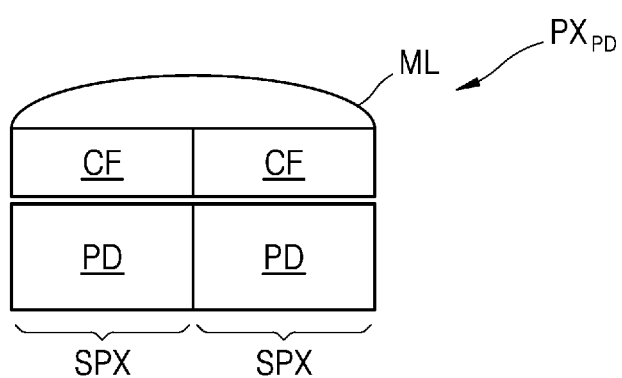

FIG. 3A schematically shows a vertical cross-sectional view of a normal pixel, and FIG. 3B schematically shows a vertical cross-sectional view of a phase difference detection pixel.

Referring to FIG. 3A, each of the plurality of pixels PX includes a light detection element, such as a photodiode PD and a color filter CF, and a micro lens ML may be provided on the color filter CF. The micro lens ML may have a circular shape.

Referring to FIG. 3B, the phase detection pixel $PX_{PD}$ includes a plurality of sub-pixels SPX having the same size as the pixel PX of FIG. 3A, and one micro lens ML may be disposed on the plurality of sub-pixels SPX. For example, when the phase detection pixel $PX_{PD}$ includes two sub-pixels SPX, the micro lens ML may have an elliptical shape. As such, the structure of the phase detection pixel $PX_{PD}$ may be different from that of a general pixel (e.g., the pixel PX of FIG. 3A).

Subsequently, referring to FIGS. 2A and 2B, in a pixel array having a regular pattern, crosstalk between pixels PX is similar, and thus, visibility of crosstalk may be weak. However, as shown in FIGS. 2A and 2B, when the pattern of the pixel arrays 110a and 110b is irregular, in other words, when the surrounding pixels of the pixel PX of the same color are arranged differently, since crosstalk is different between the pixels PX, visibility of the crosstalk may be strong. For example, different crosstalk may occur between pixels PXs of the same color due to differences in colors of adjacent pixels, microlens shapes of phase detection pixels $PX_{PD}$, and the like. Because a signal difference between pixels may occur due to the different crosstalk, image quality may deteriorate. Therefore, crosstalk correction is needed to adjust pixel values so that the influence of crosstalk is removed or minimized.

Subsequently, referring to FIG. 1, the readout circuit 120 receives electrical signals from the pixel array 110 and converts the electrical signals to digital data, such that image data (or image) including pixel values corresponding to each of a plurality of pixels may be generated. The image data is raw data.

The image signal processor 130 may perform image processing on first image data IDT1 outputted from the readout circuit 120. For example, the image signal processor 130 may perform image processing such as bad pixel correction, crosstalk correction, and noise removal on image data, for example, the first image data IDT1.

The image signal processor 130 may include a color corrector 131 and a memory 132, and the color corrector 131 may perform correction (hereinafter referred to as crosstalk correction) for removing crosstalk from a pixel value for each of pixels, for example, the pixels PX1, PX2 (see FIG. 2A).

Correction coefficients Cr, Cg, and Cb, for example, a red correction coefficient Cr, a green correction coefficient Cg, and a blue correction coefficient Cb, set for each color for each of the pixels PX that need crosstalk correction may be stored in the memory 132, and the color corrector 131 may perform crosstalk correction based on the correction coefficients Cr, Cg, and Cb.

In the calibration process of the image sensor 100, the correction coefficients Cr, Cg, Cb may be calculated based on a crosstalk level of a single light source image data generated by the image sensor 100 that captures a single light source (e.g., white light). More specifically, based on a plurality of multi-light source image data captured by a plurality of image sensors (e.g., images of various primary colors generated by capturing light sources of various primary colors), functions for each correction coefficient may be generated, and by applying the crosstalk level of the single light source image data generated in the image sensor 100 to the function, the correction coefficients Cr, Cg, and Cb for each color of the image sensor 100 may be calculated from the function. A method of calibrating the image sensor 100 according to an example embodiment will be described later in detail with reference to FIG. 4.

In FIG. 1, the memory 132 is shown to be provided inside the image signal processor 130, but is not limited thereto, and the memory 132 may be disposed in the image signal processor 130 or may be implemented as a separate semiconductor chip.

In an embodiment, as described with reference to FIG. 2A, the color corrector 131 may perform crosstalk correction on the pixels when crosstalk is different between pixels of the same color within a pixel group.

In an embodiment, as described with reference to FIG. 2B, based on the correction coefficients Cr, Cg, and Cb set for each of the pixels PX arranged around the phase detection pixel $PX_{PD}$, the color corrector 131 may perform crosstalk correction based on the phase detection pixel $PX_{PD}$.

The image signal processor 130 may further include a plurality of image processing Intellectual Properties (IPs) for performing the above-mentioned image processing in addition to the color corrector 131, and may provide image-processed image data, such as second image data IDT2, to the processor 200 (e.g., an application processor, a main processor of the electronic device 1000, a graphic processor, etc.).

Figure 4:
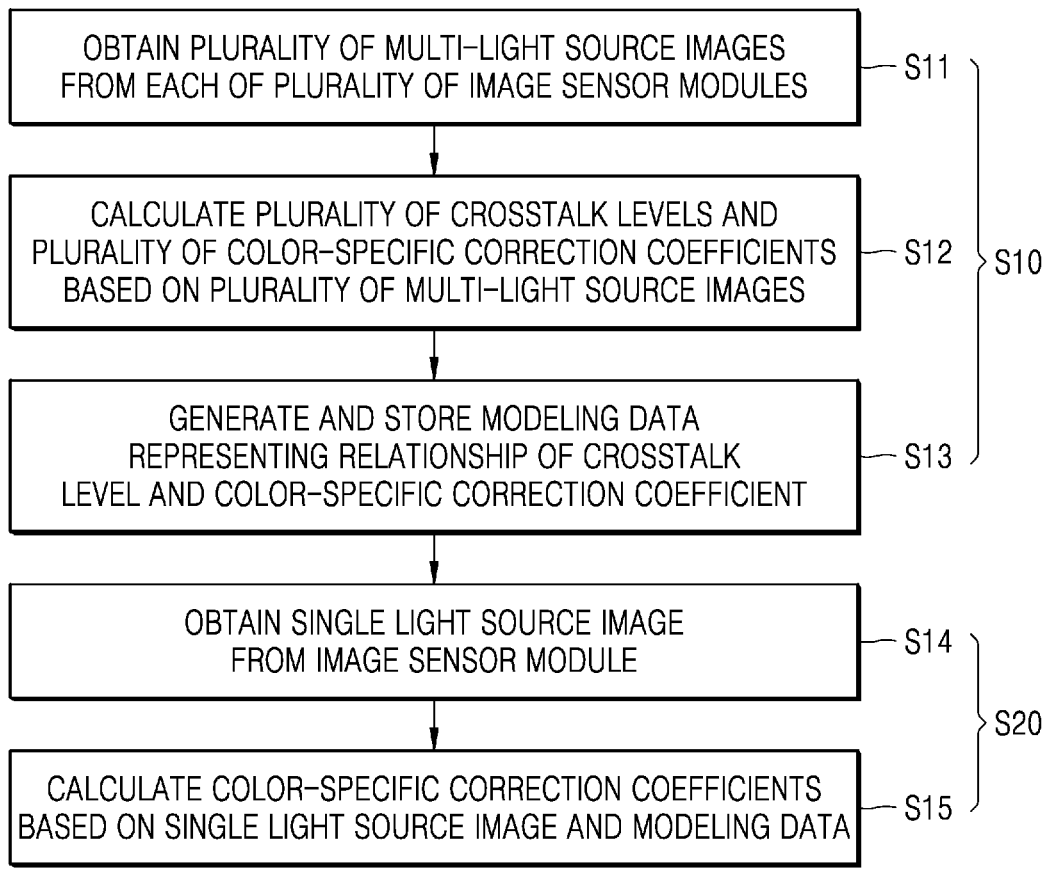
FIG. 4 is a flowchart showing a method of calibrating an image sensor according to an example embodiment.

FIG. 4 is a flowchart showing a method of calibrating an image sensor according to an example embodiment.

By using the calibration method of FIG. 4, correction coefficients for each color for crosstalk correction of the image sensor may be obtained. As an example, a calibration method for extracting (or calculating) a correction coefficient for each color for correcting crosstalk with respect to a phase detection pixel will be described.

The calibration method according to an example embodiment may be performed by a calibration device, for example, a set-up equipment (or a setup device), in a calibration operation of an image sensor module (or camera module) having the image sensor 100 (see FIG. 1). In this case, the image sensor module may include the image sensor 100 (see FIG. 1), the optical lens LS (see FIG. 1), and a housing forming the exterior of the image sensor module, and also, may further include a filter (e.g., an infrared cut filter), an actuator, and a driving circuit for driving the actuator.

A plurality of image sensor modules and a specific image sensor module mentioned in an example embodiment may have the same configuration and physical characteristics. For example, the pixel array structure, the arrangement of pixels, and the structure and number of phase detection pixels of the image sensor 100 provided in the image sensor module may be the same between image sensor modules, and an angle of view of the optical lens LS may be the same between image sensor modules.

Referring to FIG. 4, the calibration method according to an example embodiment may include a multi-light source calibration operation S10 and a single light source calibration operation S20. The multi-light source calibration operation S10 may be performed using a plurality of image sensor modules. In an embodiment, the multi-light source calibration operation S10 is performed before the mass production operation of the image sensor module, and in the mass production operation of the image sensor module, the single light source calibration operation S20 may be performed in various parameter setting operations (e.g., during setup of a calibration process) of a specific image sensor module.

A plurality of multi-light source images may be obtained from each of the plurality of image sensor modules (S11). Here, the plurality of multi-light source images refer to a plurality of primary color images generated by capturing each of a plurality of primary color light sources of different colors through the image sensor module. In order to calculate correction coefficients for each color, for example, correction coefficients Cr, Cg, and Cb for red, green, and blue colors, at least three or more primary color images may be used. Each of the plurality of image sensor modules captures light sources corresponding to a plurality of colors, such as a red light source, a green light source, and a blue light source, thereby generating a red image, a green image, and a blue image, that is, multi-light source images. In an embodiment, the plurality of image sensor modules may further generate a white image by capturing a white light source.

A plurality of crosstalk levels and a plurality of color-specific correction coefficients may be calculated based on a plurality of multi-light source images (S12). A crosstalk level and color-specific correction coefficients (e.g., Cr, Cg, and Cb) may be calculated for each of target pixels (target pixels for crosstalk correction, for example, pixels arranged around a phase detection pixel) based on the plurality of multi-light source images generated in operation S11.

Crosstalk XT may be represented by Equation 1.

$$XT = Cr \times Dr + Cg \times Dg + Cb \times Db \quad \text{[Equation 1]}$$

Here, Cr, Cg, and Cb represent a red correction coefficient, a green correction coefficient, and a blue correction coefficient, respectively, and Dr, Dg, Db are the pixel values of the target pixel in the captured image for red, green and blue, respectively. Values of Dr, Dg, Db may be calculated based on pixel values of pixels surrounding the target pixel for which crosstalk is calculated.

Crosstalk XT1, XT2, and XT3 of the target pixel may be calculated from each of the multi-light source images generated by capturing the multi-light source, for example, a red image, a green image, and a blue image through one image sensor module. For example, in each of the multi-light source images, crosstalk XT1, XT2, and XT3 of the target pixel may be calculated through comparison between pixel values. Crosstalk XT1, XT2, and XT3 may be represented by Equation 2.

$$XT1 = Cr \times Dr1 + Cg \times Dg1 + Cb \times Db1$$

$$XT2 = Cr \times Dr2 + Cg \times Dg2 + Cb \times Db2$$

$$XT3 = Cr \times Dr3 + Cg \times Dg3 + Cb \times Db3 \quad \text{[Equation 2]}$$

Here, Dr1, Dg1, Db1 are the pixel values of the target pixel in a first multi-light source image for red, green and blue, respectively; Dr2, Dg2, Db2 are the pixel values of the target pixel in a second multi-light source image for red, green and blue, respectively; and Dr3, Dg3, Db3 are the pixel values of the target pixel in a third multi-light source image for red, green and blue, respectively.

Equation 2 may be converted to Equation 3.

$$\begin{pmatrix} Cr \\ Cg \\ Cb \end{pmatrix} = \begin{pmatrix} Dr1 & Dg1 & Db1 \\ Dr2 & Dg2 & Db2 \\ Dr3 & Dg3 & Db3 \end{pmatrix}^{-1} \times \begin{pmatrix} XT1 \\ XT2 \\ XT3 \end{pmatrix} \quad \text{[Equation 3]}$$

Color-specific correction coefficients Cr, Cg, and Cb may be calculated according to Equation 3. A crosstalk level and color-specific correction coefficients may be calculated for each multi-light source image, and accordingly, a plurality of crosstalk levels and a plurality of color-specific correction coefficients may be calculated from a plurality of multi-light source images obtained from a plurality of image sensors.

As shown in Equations 2 and 3, crosstalk XT1, XT2, and XT3 of pixels in images of at least three colors is needed in order to calculate color coefficients for three colors.

In an embodiment, in operation S12, a crosstalk level for a white image may be calculated. For example, a white image may be generated based on a red image, a green image, and a blue image, and a crosstalk level in the white image may be calculated. However, one or more embodiments are not limited thereto, and a white image may be obtained by capturing a white light source through the image sensor, and a crosstalk level of a pixel in the white image may be calculated.

In an embodiment, the pixel array 110 (see FIG. 1) may be divided into a plurality of grids, and for each of the plurality of grids, crosstalk levels and color-specific correction coefficients for each of the target pixels may be calculated.

Figure 5:
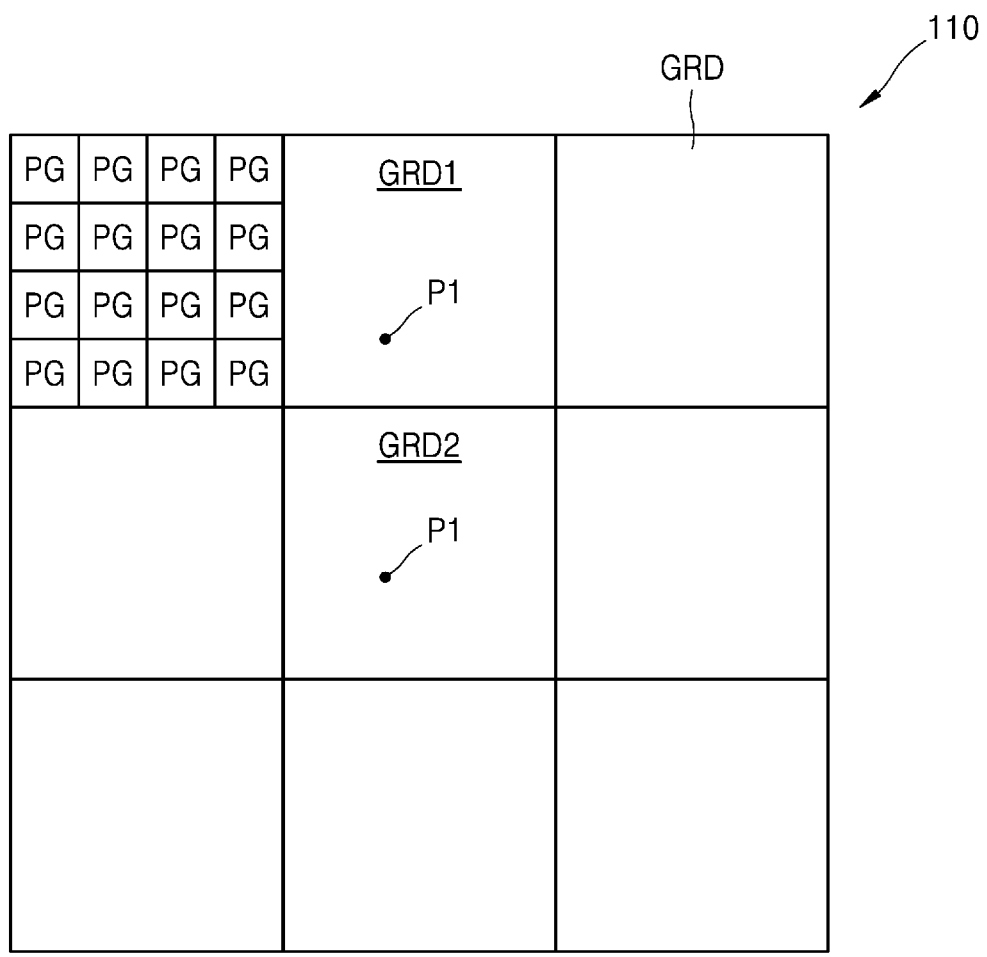
FIG. 5 shows an example in which a pixel array is divided into a plurality of grids.

FIG. 5 shows an example in which a pixel array is divided into a plurality of grids.

Referring to FIG. 5, the pixel array 110 may include nine grids GRD, and each of the plurality of grids GRD may include a plurality of pixel groups PG and have the same pattern, for example, the same arrangement of pixels. As described with reference to FIGS. 2A and 2B, each of the plurality of pixel groups PG may include a plurality of color pixels, such as a red pixel, a green pixel, and a blue pixel. In an embodiment, at least one of the plurality of pixel groups PG included in one grid GRD may include the phase detection pixel PXPD (see FIG. 3A). In each of the plurality of grids GRD, the phase detection pixel PXPD (see FIG. 3A) may be located at the same position.

As such, the plurality of grids GRD may have the same structure. However, crosstalk may be different between pixels disposed at the same position in each of the plurality of grids GRID. For example, even if correction target pixels (referred to as a first pixel and a second pixel, respectively) of the same color are located at the same point P1 in the first grid GRID and the second grid GRD2 and the type and color of the pixels located around the first pixel and the second pixel are the same, crosstalk of the first pixel of the first grid GRID and the second pixel of the second grid GRD2 may be different. For example, amounts of light received by each of the first grid GRID and the second grid GRID may be different according to dispersion caused by a manufacturing process of the image sensor 100 or the positions of the first grid GRID and the second grid GRD2. Accordingly, characteristics of the first grid GRID and the second grid GRD2 may be different, and as such, the crosstalk of the first pixel and the crosstalk of the second pixel may be different. Therefore, when correcting crosstalk for the first pixel and the second pixel, different color-specific correction coefficients may be applied. Therefore, in operation S12, a color-specific correction coefficient of the target pixel may be calculated for each of the plurality of grids GRD.

Furthermore, although it has been described that correction coefficients Cr, Cg, and Cb for red, green and blue colors are calculated, respectively, one or more embodiments are not limited thereto, and as described above, the pixel array 110 may include pixels corresponding to combinations of different colors, and correction coefficients for different colors may be calculated. As an example, the pixel array includes a yellow pixel, a cyan pixel, and a green pixel, and respective correction coefficients for yellow, cyan, and green colors may be calculated.

Subsequently, referring to FIG. 4, modeling data indicating a relationship between a crosstalk level and a correction coefficient for each color may be generated and stored (S13). Based on the trend of a target pixel specific crosstalk level and color-specific correction coefficients calculated in operation S12, the relationship of the color-specific correction coefficient to the crosstalk level may be modeled as a linear function or a multi-order function, and data representing the function, for example, coefficients for each order of the function, may be generated as modeling data. The modeling data may include data for each of a plurality of target pixels, for each of a plurality of grids.

Figure 6A:
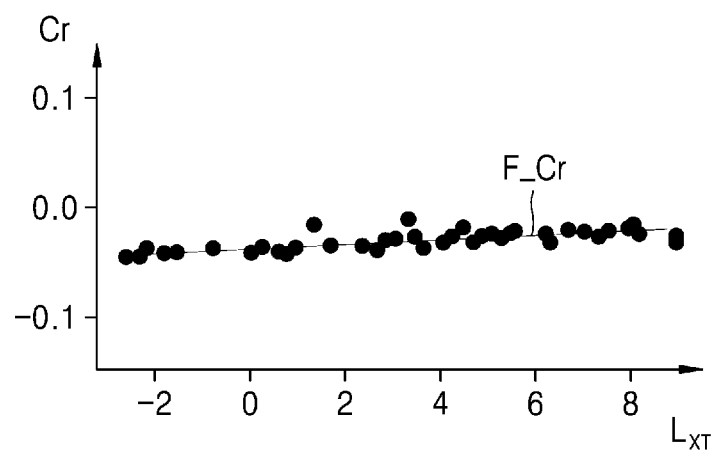
FIGS. 6A, 6B, and 6C are graphs showing a relationship between a crosstalk level and a correction coefficient.
Figure 6B:
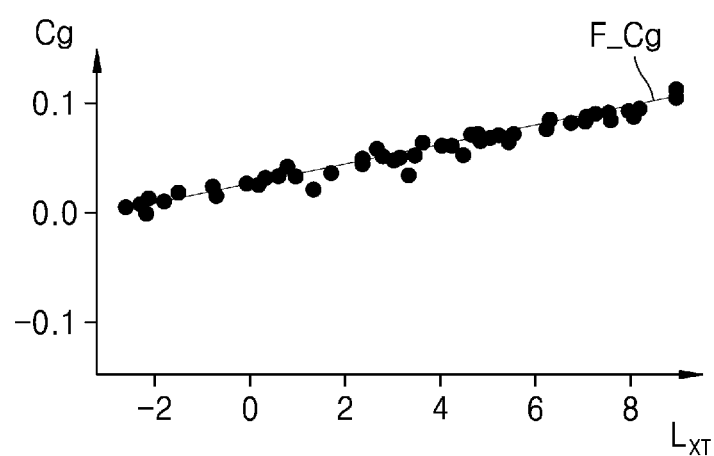
Figure 6C:
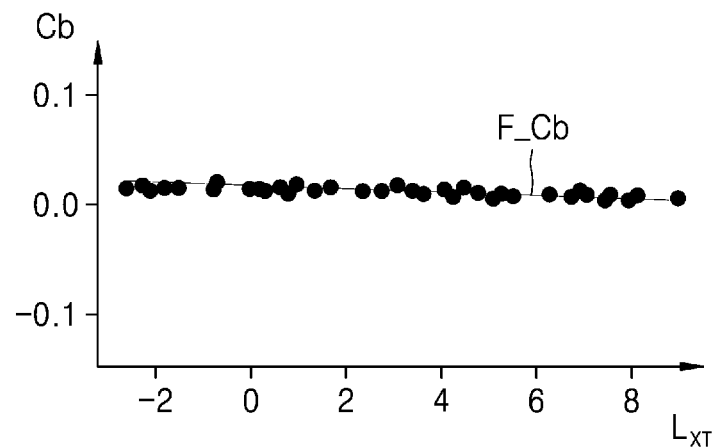

FIGS. 6A, 6B, and 6C are graphs showing a relationship between a crosstalk level and a correction coefficient.

In the graphs of FIGS. 6A to 6C, a horizontal axis represents a crosstalk level $L_{XT}$, and a vertical axis represents a color-specific correction coefficient. If a plurality of crosstalk levels and a plurality of color-specific correction coefficients calculated in operation S12 of FIG. 4 are classified according to correction coefficients for each color, crosstalk level distribution of color-specific correction coefficients Cr, Cg, and Cb for the crosstalk level $L_{XT}$ may be shown in a graph as shown in FIGS. 6A to 6C.

In an embodiment, the crosstalk level $L_{XT}$ may be a value calculated based on a white image. However, one or more embodiments are not limited thereto, and the crosstalk level $L_{XT}$ may be a value calculated based on another color image of the multi-light source image obtained in operation S11.

For each color, the relationship between the crosstalk level $L_{XT}$ and the correction coefficient may be modeled as an optimal function through regression analysis. For example, a function F_Cr may be modeled for a red correction coefficient Cr, a function F_Cg may be modeled for a green correction coefficient Cg, and a function F_Cb may be modeled for a blue correction coefficient Cb. The inputs of the functions F_Cr, F_Cg and F_Cb are the crosstalk level $L_{XT}$.

In FIGS. 6A to 6C, the functions F_Cr, F_Cg, and F_Cb are mainly shown to be linear functions, but are not limited thereto, and the relationship between the crosstalk level $L_{XT}$ and correction coefficients may be modeled as a multi-order function.

Subsequently, referring to FIG. 4, for each of the target pixels of each grid GRD, the relationship between the crosstalk level $L_{XT}$ and color-specific correction coefficients may be modeled, and coefficients of each order of the modeled function may be generated as modeling data. The modeling data may be stored in a calibration device of an image sensor, for example, a setup device of an image sensor module.

After the modeling data is generated, a single light source calibration operation S20 may be performed. The single light source calibration operation S20 may be performed for each image sensor module based on modeling data generated in the multi-light source calibration operation S10.

A single light source image may be obtained from the image sensor module (S14). The image sensor module may generate a single light source image by capturing one light source. In an embodiment, the image sensor module may generate a white image by capturing a white light source.

Color-specific correction coefficients may be calculated based on the single light source image and modeling data (S15). The crosstalk level of the target pixel may be calculated from a single light source image, such as a white image, and based on the calculated crosstalk level and modeling data for the target pixel, color-specific correction coefficients (e.g., Cr, Cg, and Cb) for the target pixel may be calculated. For example, based on modeling data, functions of the color-specific correction coefficient for the crosstalk level (functions for each of red, green, and blue colors) may be restored, and by applying the crosstalk level of the target pixel to the reconstructed functions, color-specific correction coefficients of the target pixel may be calculated. For each target pixel provided in each of the plurality of grids, color-specific correction coefficients may be calculated based on corresponding modeling functions and the crosstalk level of the target pixel.

In this way, in the single light source calibration operation S20, by using the modeling data generated in the multi-light source calibration operation S10, color-specific correction coefficients may be calculated based on a single light source image obtained by capturing a single light source by using an image sensor module. The calculated color-specific correction coefficients may be stored in a memory in the image sensor module, for example, in the memory 132 of the image sensor 100 of FIG. 1. During the image sensing operation of the image sensor 100, the color corrector 131 (see FIG. 1) may perform crosstalk compensation on a target pixel based on color-specific correction coefficients.

As described above, according to the calibration method of the image sensor according to an example embodiment, in the multi-light source calibration operation S10, the plurality of image sensor modules respectively capture a plurality of light sources to generate a plurality of multi-light source images, and modeling data representing a relationship between a crosstalk level and a color-specific correction coefficient may be generated based on the plurality of multi-light source images. Thereafter, in order to extract color-specific correction coefficients for a specific image sensor module, the single light source calibration operation S20 is performed, and at this time, the specific image sensor module captures a single light source to generate a single light source image without the need to capture a plurality of light sources, and based on the crosstalk level of a target pixel calculated based on a single light source image and modeling data, color-specific correction coefficients for each of the target pixel may be calculated.

As a comparative example, in the related art image sensor calibration operation (e.g., a calibration operation in a mass production operation of an image sensor module), when the calibration device obtains the correction coefficient based on a single light source image generated by the image sensor capturing a single light source, appropriate correction may not be made with respect to an image generated by capturing a subject including various colors. On the other hand, in order to calculate the color-specific correction coefficients, a multi-light source image corresponding to the number of colors is required, and accordingly, in the related art calibration operation for an image sensor (or image sensor module), if a multi-light source is captured to generate multi-light source images, such as red, green and blue images, and based on these images, the calibration device calculates color-specific correction coefficients, the burden of installing a plurality of light sources and the burden of multi-light source capturing and multi-light source image processing (e.g., increase in a processing time, memory usage, and cost) is high.

However, according to the method of calibrating an image sensor according to an example embodiment described with reference to FIG. 4, based on the multi-light source image, modeling data representing the relationship between the crosstalk level and the color-specific correction coefficient is generated and stored in the calibration device in advance, and in the calibration operation of the image sensor (e.g., S20 of FIG. 4), the image sensor captures a single light source to generate a single light source image, and the calibration device may calculate a crosstalk level of a target pixel from the single light source image, and calculate a color-specific correction coefficient for the target pixel based on the calculated crosstalk level and modeling data of the target pixel.

Accordingly, it is not required to install additional equipment, such as a plurality of light sources, required for multi-light source image acquisition, and the burden for image processing in the calibration operation of the image sensor and the time required for calibration (e.g., setup time) may be reduced.

Figure 7:
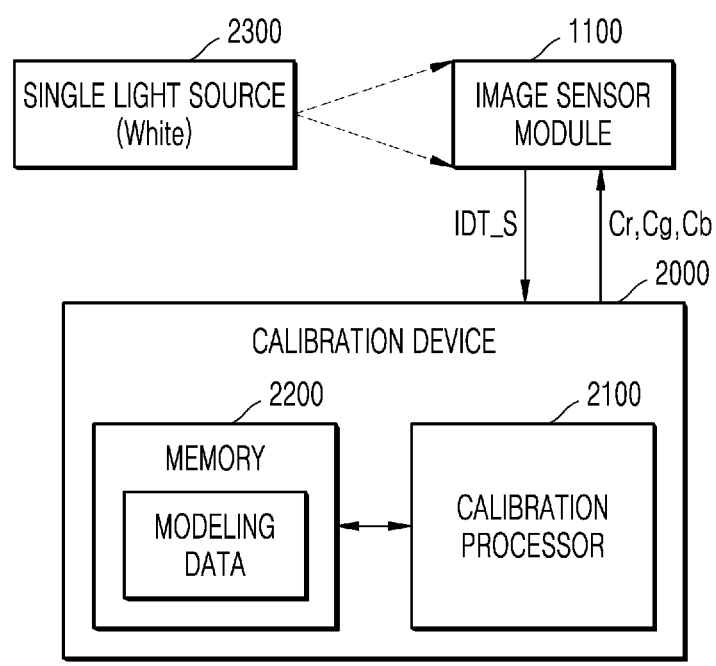
FIG. 7 shows an example of a device for calibrating an image sensor according to an example embodiment.

FIG. 7 shows an example of a calibration device of an image sensor according to an example embodiment.

Referring to FIG. 7, a calibration device 2000 may include a calibration processor 2100 and a memory 2200.

The memory 2200 may store modeling data representing color-specific correction coefficient functions for each of a plurality of target pixels. For example, the modeling data may include coefficients of each order of the color-specific correction coefficient functions. Modeling data generated in the multi-light source calibration operation S20 of FIG. 4 may be stored in the memory 2200. For example, modeling data may be generated based on a plurality of multi-light source images generated by capturing a plurality of light sources in a plurality of image sensor modules, and may include coefficients of each order of the color-specific correction coefficient functions.

Figure 8:
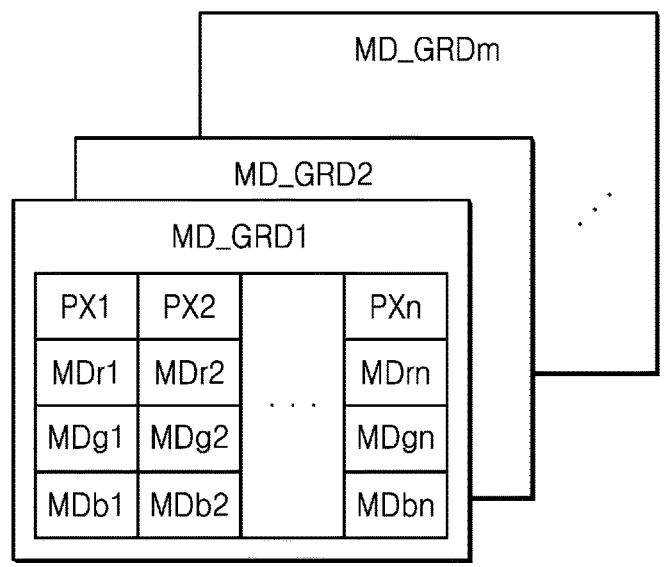
FIG. 8 shows modeling data according to an example embodiment.

FIG. 8 shows modeling data according to an example embodiment.

Referring to FIG. 8, an image sensor of an image sensor module 1100 (refer to FIG. 7) includes a pixel array divided into a plurality of grids, and the modeling data may include grid-specific modeling data MD_GRD1 to MD_GRDm for each of the plurality of grids (m is an integer greater than or equal to 4).

Grid-specific modeling data, for example, modeling data MD_GRD1 of the first grid, may include color-specific modeling data MDr1, MDg1, and MDb1 for each of a plurality of target pixels PX1 to PXn (n is a positive integer) included in the first grid. The color-specific modeling data MDr1, MDg1, and MDb1 may include coefficients of each order of color-specific correction coefficient functions for a target pixel. For example, a first color modeling data MDr1 may include coefficients of each order of the correction coefficient function of a first color (e.g., red); a second color modeling data MDg1 may include coefficients of each order of the correction coefficient function of a second color (e.g., green), and a third color modeling data MDb1 may include coefficients of each order of the correction coefficient function of a third color (e.g., blue).

Subsequently, referring to FIG. 7, the calibration device 2000 may receive a single light source image IDT_S from the image sensor module 1100, and based on the single light source image IDT_S and the modeling data, may calculate color-specific correction coefficients Cr, Cg, and Cb for each of a plurality of target pixels of the image sensor module 1100. In this case, the single light source image IDT_S may be generated by capturing the single light source 2300 through the image sensor module 1100. In an embodiment, the single light source 2300 may be a white light source, and the single light source image IDT_S may be a white image.

The calibration device 2000 calculates a crosstalk level of each of a plurality of target pixels from the single light source image IDT_S, and calculate color-specific correction coefficients Cr, Cg, and Cb by applying the crosstalk level to color-specific correction coefficient functions for each of a plurality of target pixels restored based on the modeling data.

The calibration device 2000 may store color-specific correction coefficients Cr, Cg, and Cb for each of a plurality of target pixels in the image sensor module 1100. When the image sensor module 1100 performs image sensing, the color corrector (e.g., 131 of FIG. 1) of the image sensor may perform crosstalk correction based on color-specific correction coefficient Cr, Cg, and Cb respectively corresponding to a plurality of target pixels.

In an embodiment, the calibration device 2000 may be implemented by a combination of a general-purpose processor such as a Micro Controller Unit (MCU) and a Central Processing Unit (CPU) and firmware (or software module). For example, the firmware or software module may include a program or algorithm including the functions of the calibration device 2000 described above. However, one or more embodiments are not limited thereto, and the calibration device 2000 may be implemented with hardware logic such as a Field Programmable Gate Array (FPGA), an Application Specific IC (ASIC), or a Complex Programmable Logic Device (CPLD), which perform the above-described functions.

As described with reference to FIG. 7, the calibration device 2000 according to the example embodiment may store modeling data generated based on a plurality of multi-light source images in advance, and calculate color-specific correction coefficients Cr, Cg, and Cb of the image sensor module 1100 based on the single light source image IDT_S captured by the image sensor module 1100 and the modeling data.

Figure 9:
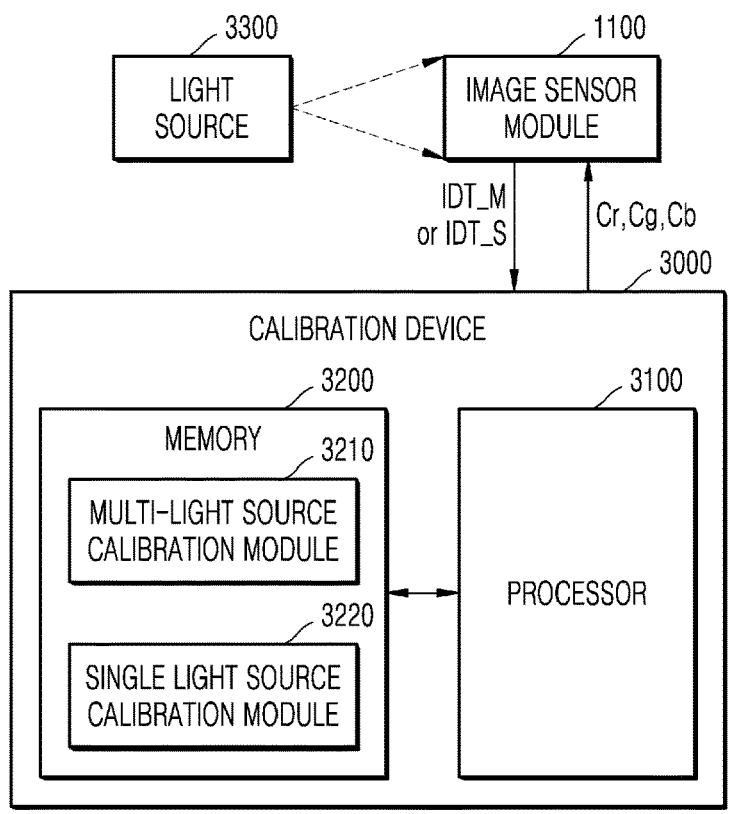
FIG. 9 shows an example of a device for calibrating an image sensor according to an example embodiment.

FIG. 9 shows an example of a calibration device of an image sensor according to an example embodiment.

Referring to FIG. 9, a calibration device 3000 may include a calibration processor 2100 and a memory 2200. The memory 2200 may store a multi-light source calibration module 3210 and a single light source calibration module 3220. Here, the multi-light source calibration module 3210 and the single light source calibration module 3220 may be software modules. The multi-light source calibration module 3210 includes a program (or a calibration tool) for performing the multi-light source calibration operation S10 (see FIG. 4), and the single light source calibration module 3220 may include a program (or a calibration tool) for performing the single light source calibration operation S20 (see FIG. 4).

The processor 3100 may execute the multi-light source calibration module 3210 and the single light source calibration module 3220 to perform the calibration method of the image sensor according to the example embodiment described above. Accordingly, the processor 3100 may calculate color-specific correction coefficients (e.g., Cr, Cg, and Cb) for crosstalk correction.

The processor 3100 may execute the multi-light source calibration module 3210 to receive a plurality of captured multi-light source images IDT_M from a plurality of arbitrary image sensor modules 1100, model the relationship between color-specific correction coefficients and the crosstalk level based on the plurality of multi-light source images IDT_M into a correction coefficient function, and calculate modeling data, for example, a coefficient of each order of a correction coefficient function. In an embodiment, the memory 3200 may store modeling data, and the modeling data may be used in a single light source calibration operation.

The processor 3100 executes the single light source calibration module 3220, so that the image sensor module 1100, for example, a specific image sensor module 1100, may be controlled to capture a single light source and generate a single light source image IDT_S. In an embodiment, the processor 3100 may receive a single light source image IDT_S from the image sensor module 1100, and calculate color-specific correction coefficients Cr, CG, and Cb based on the single light source image IDT_S and modeling data. The calibration device 3000 may store the color-specific correction coefficients Cr, CG, and Cb in the image sensor module 1100.

Figure 10:
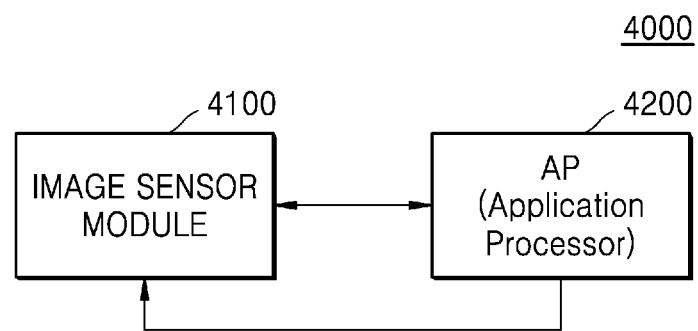
FIG. 10 is a block diagram schematically illustrating an electronic system according to an example embodiment.

FIG. 10 is a block diagram schematically illustrating an electronic system according to an example embodiment.

Referring to FIG. 10, an electronic system 4000 may include an image sensor module 4100 and an application processor (AP) 4200. The electronic system 4000 may be mounted on a smartphone, for example, and may further include general-purpose components, such as a communication module, a working memory, an input/output module, and a display module.

The image sensor module 4100 may include the image sensor 100 (see FIG. 1), and the image sensor 100 may store color-specific correction coefficients calculated through the calibration method of the image sensor according to the above-described embodiment for each of the target pixels, and during an image sensing operation, perform crosstalk correction based on the color-specific correction coefficients. Accordingly, image quality of an image generated by the image sensor may be improved.

The AP 4200 controls the overall operation of the electronic system 4000 and may be implemented as a system-on-chip (SoC) that drives an application program and an operating system. The AP 4200 may control the image sensor module 4100, generate control signals for controlling the image sensor module 4100, and provide the control signals to the image sensor module 4100. For example, the AP 4200 may receive a phase difference signal from the image sensor module 4100 and control the image sensor module 4100 to perform auto focusing based on the phase difference signal. As described above, the phase difference signal may be generated by the phase detection pixel. The AP 4200 may provide a control signal for auto focusing to the image sensor module 4100 based on the phase difference. The image sensor module 4100 may perform auto focusing by moving the lens in a direction increasing or decreasing a distance from a subject based on the control signal.

In addition, the AP 4200 may receive an image from the image sensor module 4100, perform additional image processing (e.g., image quality compensation, processing to increase a dynamic range of an image, gamma compensation, and the like) on the received image, and store the image-processed image in a memory or provide the image-processed image to a display module (e.g., a display device). In addition, the AP 4200 may extract additional information (e.g., subject recognition information of the image, and the position of the subject in the image) from the image, and provide the information to a user or control the electronic system 4000 based on the information.

While the inventive concept has been particularly shown and described with reference to example embodiments thereof, it will be understood that various changes in form and details may be made therein without departing from the spirit and scope of the following claims.

What is claimed is:

1. A method of calibrating an image sensor, the method comprising:
    obtaining a plurality of multi-light source images generated from a plurality of image sensor modules, wherein each of the plurality of image sensor modules generates at least three multi-light source images;
    obtaining, based on the plurality of multi-light source images, a plurality of crosstalk levels and a plurality of color-specific correction coefficients;
    generating modeling data based on a relationship between a crosstalk level for a first color and the plurality of color-specific correction coefficients;
    receiving a single light source image captured by a first image sensor module; and
    based on the received single light source image and the modeling data, obtaining a color-specific correction coefficient for a target pixel of an image sensor of the first image sensor module, the color-specific correction coefficient being usable for correcting a crosstalk of the target pixel,
    wherein each of the plurality of multi-light source images is different from the single light source image.

2. The method of claim 1, wherein the obtaining the color-specific correction coefficient for the target pixel comprises:
    obtaining a crosstalk level of the target pixel from the single light source image;
    restoring color-specific correction coefficient functions corresponding to the target pixel by using the modeling data; and
    obtaining color-specific correction coefficients for the target pixel by respectively applying the crosstalk level of the target pixel to the color-specific correction coefficient functions.

3. The method of claim 2, wherein the first color is white, and the single light source image is a white image.

4. The method of claim 1, wherein the color-specific correction coefficient comprises a correction coefficient for each of a plurality of colors, the plurality of colors being different from each other.

5. The method of claim 1, wherein the color-specific correction coefficient comprises a correction coefficient for a red color, a correction coefficient for a green color, and a correction coefficient for a blue color.

6. The method of claim 1, further comprising storing the color-specific correction coefficient for the target pixel in the first image sensor module.

7. The method of claim 1, wherein the generating the modeling data comprises:
    modeling a correction coefficient function for each color-specific correction coefficient of the plurality of color-specific correction coefficients through regression analysis on the plurality of crosstalk levels and the plurality of color-specific correction coefficients; and
    obtaining the modeling data representing the correction coefficient function.

8. The method of claim 7, wherein the modeling data comprises coefficients for each order of the correction coefficient function.

9. The method of claim 1, wherein the target pixel is one of a plurality of pixels disposed around a phase detection pixel that is provided in a pixel array of the image sensor.

10. The method of claim 1, wherein a pixel array of the image sensor comprises a plurality of pixels of the same color arranged in a k×k matrix, k being an integer that is greater than or equal to 2, and
    wherein the target pixel is at least one of the plurality of pixels.

11. A device for calibrating an image sensor, the device comprising:
    a memory configured to store modeling data, the modeling data representing color-specific correction coefficient functions obtained based on a plurality of multi-light source images; and
    a processor configured to:
    receive a single light source image obtained from an image sensor,
    obtain a crosstalk level of a target pixel from the single light source image obtained from the image sensor, and
    obtain a color-specific correction coefficient of the target pixel based on the modeling data and the crosstalk level of the target pixel, the color-specific correction coefficient being usable for correcting a crosstalk of the target pixel,
    wherein each of the plurality of multi-light source images is different from the single light source image.

12. The device of claim 11, wherein the color-specific correction coefficient functions are generated based on a plurality of crosstalk levels and a plurality of color-specific correction coefficients, the plurality of crosstalk levels and the plurality of color-specific correction coefficients being obtained from the plurality of multi-light source images.

13. The device of claim 11, wherein the color-specific correction coefficient functions comprise a first correction coefficient function for a first color, a second correction coefficient function for a second color, and a third correction coefficient function for a third color, and wherein the first color, the second color, and the third color are different from each other.

14. The device of claim 11, wherein each of the color-specific correction coefficient functions represents a relationship between a crosstalk level for a first color and a corresponding color-specific correction coefficient, and wherein the single light source image is an image of the first color.

15. The device of claim 11, wherein the image sensor comprises a pixel array divided into a plurality of grids, and wherein the modeling data represents the color-specific correction coefficient functions for each of a plurality of target pixels, the plurality of target pixels being provided in the plurality of grids.

16. The device of claim 11, wherein the modeling data comprises coefficients for each order of the color-specific correction coefficient functions.

17. A method of calibrating an image sensor, the method comprising:

receiving a single light source image obtained from an image sensor;

obtaining a crosstalk level of a target pixel from the single light source image obtained from the image sensor;

obtaining a color-specific correction coefficient of the target pixel by applying the crosstalk level to color-specific correction coefficient functions pre-obtained on a plurality of multi-light source images, the color-specific correction coefficient being usable for correcting a crosstalk of the target pixel, wherein each of the plurality of multi-light source images is different from the single light source image.

18. The method of claim 17, wherein the color-specific correction coefficient functions are pre-obtained in advance based on a plurality of crosstalk levels and a plurality of color-specific correction coefficients, the plurality of crosstalk levels and the plurality of color-specific correction coefficients being obtained from the plurality of multi-light source images.

19. The method of claim 17, wherein the single light source image is an image generated by capturing a white light source through the image sensor.

20. The method of claim 17, wherein the color-specific correction coefficient functions comprise a correction coefficient function for each of at least three colors.

* * * * *